US006751879B1

United States Patent
Pu (10) Patent No.: US 6,751,879 B1
(45) Date of Patent: Jun. 22, 2004

(54) LASER METER

(76) Inventor: Jian-Hua Pu, P.O. Box No. 6-57, Chung-Ho, Taipei, 235 (TW)

(*) Notice: Subject to any disclaimer, the term of this patent is extended or adjusted under 35 U.S.C. 154(b) by 0 days.

(21) Appl. No.: 10/310,894

(22) Filed: Dec. 6, 2002

(51) Int. Cl.⁷ .......................... G01C 15/02; G01B 11/26
(52) U.S. Cl. ...................... 33/286; 33/227; 33/DIG. 21
(58) Field of Search .................... 33/227, 262, 263, 33/281, 282, 285, 286, 370, 379, DIG. 21

(56) References Cited

U.S. PATENT DOCUMENTS

| | | | | |
|---|---|---|---|---|
| 4,879,814 A | * | 11/1989 | Wallace et al. | 33/DIG. 21 |
| 5,012,585 A | * | 5/1991 | DiMaggio | 33/286 |
| 5,568,265 A | * | 10/1996 | Matthews | 33/286 |
| 5,836,081 A | * | 11/1998 | Orosz, Jr. | 33/DIG. 21 |
| 5,842,282 A | * | 12/1998 | Ting | 33/227 |
| 5,894,675 A | * | 4/1999 | Cericola | 33/DIG. 21 |
| 6,012,229 A | * | 1/2000 | Shiao | 33/227 |
| 6,493,955 B1 | * | 12/2002 | Moretti | 33/DIG. 21 |
| 6,532,676 B2 | * | 3/2003 | Cunningham | 33/286 |
| 6,625,895 B2 | * | 9/2003 | Tacklind et al. | 33/286 |
| 2001/0034944 A1 | * | 11/2001 | Cunningham | 33/286 |
| 2002/0073561 A1 | * | 6/2002 | Liao | 33/286 |
| 2003/0014872 A1 | * | 1/2003 | Chen | 33/286 |

* cited by examiner

*Primary Examiner*—G. Bradley Bennett
(74) *Attorney, Agent, or Firm*—Rosenberg, Klein & Lee (57) ABSTRACT

A laser meter includes a casing; a laser module inside the casing; and a reflection means coaxial with the laser module and having circular circumference. The laser meter can provide both horizontal and vertical light beam for mark and consumes lower power.

16 Claims, 10 Drawing Sheets

FIG. 1

PRIOR ART

LASER METER

BACKGROUND OF THE INVENTION (a) Field of the Invention

The present invention relates to a laser meter, especially to a laser meter providing both horizontal and vertical light beam for mark and consuming lower power.

(b) Description of the Prior Art

The laser meter generally comprises a laser module emitting a single laser beam driven by a high-speed motor for circular scanning. The circular scanning light is emitted on a work surface, a user view views the reflected light of the circular scanning light as a liner light due to persistence of vision.

However, the laser light has high power density and may damage human's eye as revealed by the case of laser point pen in Japan, which had hurt child's eyes. However, the laser light does not provide sufficient luminance for indication once its power is reduced.

Moreover, the conventional laser meter generally requires considerable electrical power for motor, which should drive the laser beam in high-speed circular motion.

Moreover, the motor itself has considerable weight and is generally used with a rack to emit light in horizontal direction. The light in vertical direction to ground is hard to obtain. Therefore, the conventional laser meter has the drawbacks of eye damage, high electrical power and impossibility for light in vertical direction.

SUMMARY OF THE INVENTION

It is an object of the present invention to provide a laser meter with continuous and planar laser beam and high compactness.

In the first aspect of the present invention, the laser meter is located on a carrier for easy adjustment.

In the second aspect of the present invention, the laser meter has an adjusting screw and a tension spring for horizontal adjustment.

In the third aspect of the present invention, the laser meter can be rotated with 90 degree.

In the fourth aspect of the present invention, the laser meter can rotated to provide horizontal and vertical mark.

In the fifth aspect of the present invention, the laser meter has elongated level.

In the sixth aspect of the present invention, the laser meter has a reflecting means with a through hole for emitting laser light.

In the seventh aspect of the present invention, the laser meter has a casing with a conic section for supporting.

In the eighth aspect of the present invention, the laser meter has an adjusting screw opposite to the conic section.

In the ninth aspect of the present invention, the laser meter has a reflective type reflecting means.

In the tenth aspect of the present invention, the reflecting means is made of light conducting material.

In the eleventh aspect of the present invention, the laser meter has an enclosure for protecting purpose.

In the twelfth aspect of the present invention, the casing is placed atop a floating supporter.

In the thirteenth aspect of the present invention, the laser meter has a circular bubble level.

In the fourteenth aspect of the present invention, the laser meter is hung on a plumb.

In the fifteenth aspect of the present invention, the laser meter has a reflecting disk.

In the Sixteenth aspect of the present invention, the reflection means is performed as an inner curve arc-shaped surface in achieving the light beam focusing effect and thus relatively preformed in a reduced height thereof.

The various objects and advantages of the present invention will be more readily understood from the following detailed description when read in conjunction with the appended drawing, in which:

BRIEF DESCRIPTION OF DRAWING

FIG. 5-1 shows a perspective view of the laser meter of the present invention;

FIG. 5-2 shows a sectional view of the laser meter of the present invention;

FIG. 5-3 shows another perspective view of the laser meter of the present invention;

DETAILED DESCRIPTION OF THE INVENTION

Figure 1:
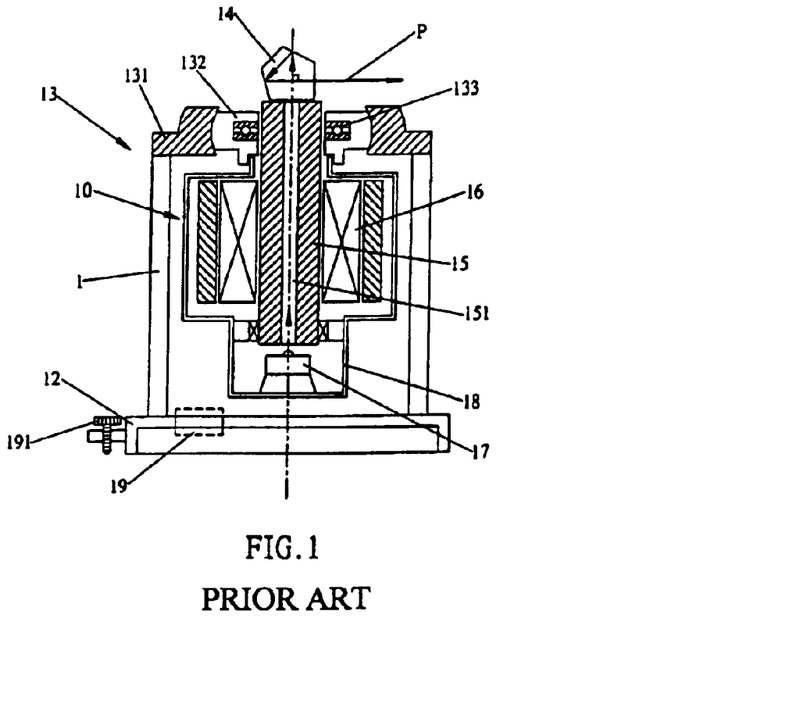
FIG. 1 show a prior art laser meter.

FIG. 1 shows a prior art horizontal laser meter, which comprises a base 1 with a motor 10 arranged on a shoulder of the base 1. The base 1 has an eye-shaped level 19 with an adjusting button 191 to adjust horizontal position of the motor 10. The base 1 has a coupling stage 131 with a connector 132 with a pivotal part 133 corresponding to the axis 15 of the motor 10. The axis 15 is assembled with winding 16 within a casing 18 to form the motor 18. A laser 17 is provided in the casing 18, the beam thereof passes through a through hole 151 of the axis 15. A refracting means 14 is formed at output end of the axis 15 to deflect the beam into a horizontal beam P.

The motor 10 drives the beam P to form circular scanning with high speed to provide linear indication. Therefore, high driving AC power is required to drive the motor. If the motor is driven with low DC voltage, the motor needs large current and the risk to damage human eye is increased.

The connector 132 is movable with the coupling stage 131 and the laser 17 will emit laser beam in vertical direction. The adjusting button 191 will roughly adjust the base 1 in horizontal direction. The horizontal beam can be obtained by the weight pro se of the motor 10 and the refraction action of the refracting means 14.

The inner face of the coupling stage 131 is in movable contact with the outer face of the connector 132 such that the motor 10 can drive the laser in vertical direction and horizontal beam P can be obtained by the refracting means 14.

As described above description, the horizontal beam is obtained by the weight pro se of the motor and a bearing means 13. Therefore, the laser meter described above is hard to use after it is rotated 90 degree. The conventional laser meter is limited to horizontal marking and consumes high power for daytime use. For example, a 10 AH battery is required and the volume is bulky.

Therefore, the present invention is intended to provide a laser meter with low power and projecting in omni direction way, thus providing a light marking for horizontal or vertical direction.

Figure 2:
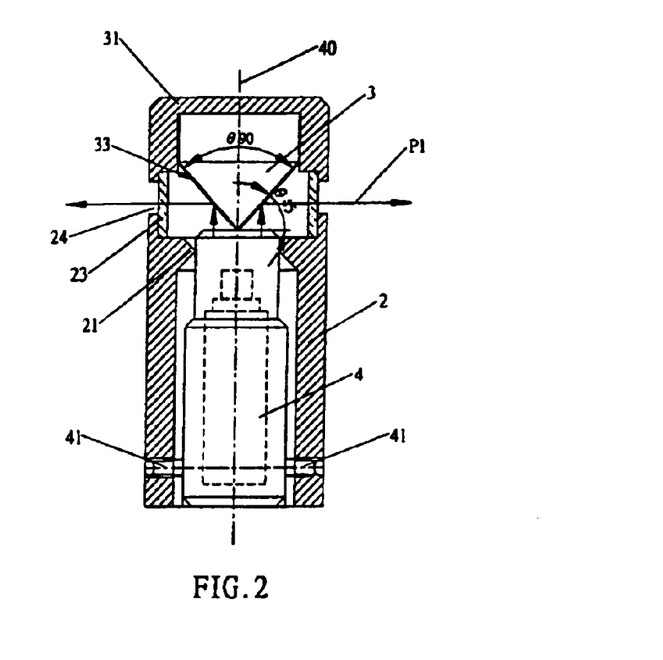
FIG. 2 is a sectional view of the laser meter of the present invention.

FIG. 2 shows a schematic diagram of the present invention. The laser meter comprises a laser module 4 opposite to a conic refractor means 3 and enclosed by a cylindrical casing 2 and a shell 31. The laser module 4 in the cylindrical casing 2 emits an annulus light beam to the refraction face 33 of the conic refractor means 3, wherein the refraction face 33 is 45 degree with respect to the horizontal plane and the apex angle of the conic refractor means 3 is 90 degree. A transparent cover 23 is provided between the cylindrical casing 2 and the shell 31 to define an annulus window 24. The laser light from the laser module 4 is reflected by the conic refractor means 3 to emit horizontal light beam P1. The casing 2 has conic bump 21 on shoulder thereof and corresponding to the upper end of the laser module 4 for point support. The casing 2 can be adjusted at bottom thereof by clamping screws 41 and adjusting the emitting angle of beam.

Figure 3:
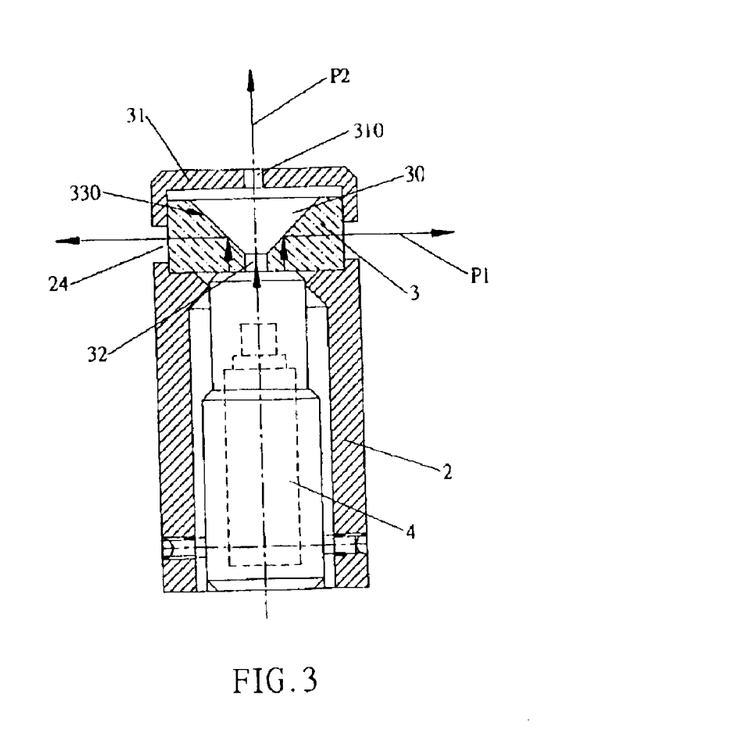
FIG. 3 shows the application of the laser meter of the present invention.

With reference to FIG. 3, the shell 31 has a slit 310 at center thereof corresponding to the casing 2. The conic refractor means 3 has a through hole 32 corresponding to the axis of laser light to emit an axial light P2. The conic refractor means 3 has a reflecting face 330 to form a horizontal beam P1 vertical to the beam P2.

Figure 4:
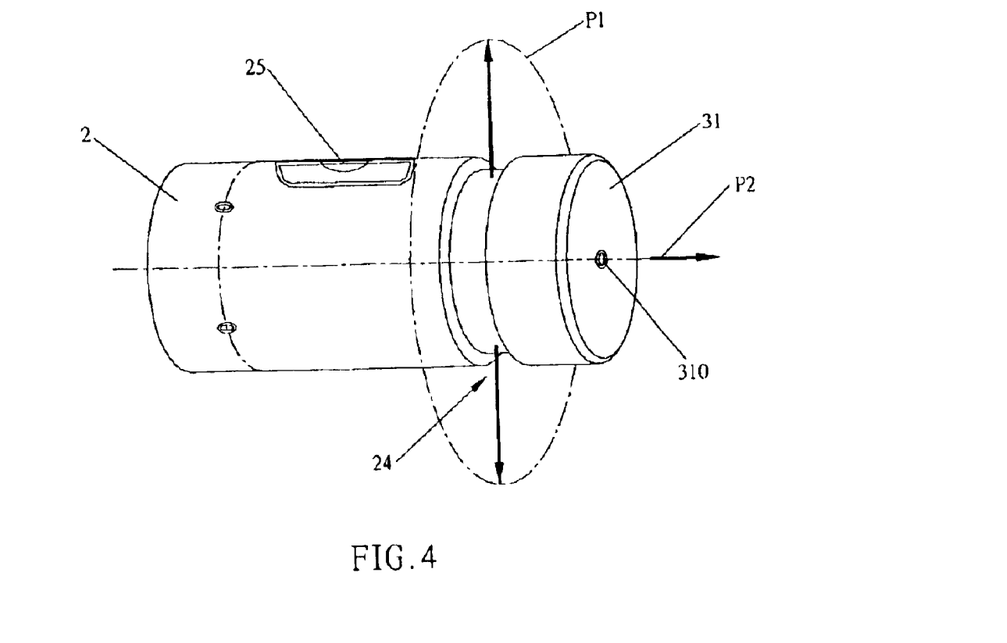
FIG. 4 is a perspective view of the laser meter of the present invention.

With reference to FIG. 4, the casing 2 is cylindrical shape and has window 24 behind the shell 31 for emitting planar light beam P1. The slit 310 emits vertical beam P2. A tubular level 25 is arranged on circumference of the casing 2.

Figure 5:
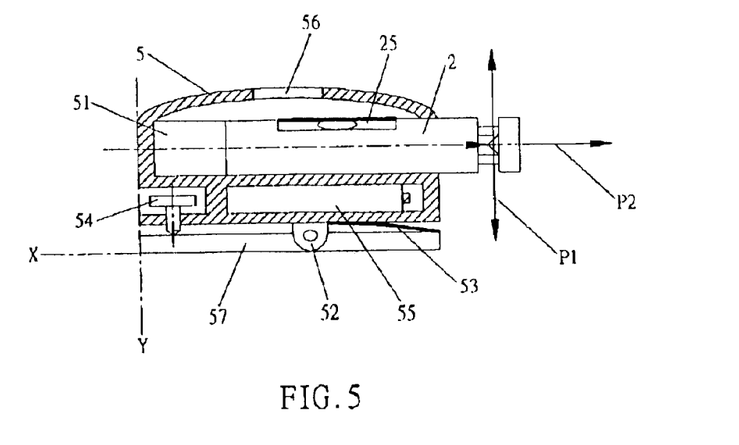
FIG. 5 also shows the application of the laser meter of the present invention.

FIG. 5 shows the application of the present invention, which is mainly used for indication in vertical mark by the horizontal beam P1. The casing 2 is used with a carrier 5 with a receiving slot 51 to receive the casing and a coupling stage 52 on bottom thereof and connected to a base 57. The coupling stage 52 has a tension spring 53 on one end thereof such that the horizontal state of the casing 2 can be adjusted by a screw 54. The horizontal state can be checked by viewing a level 25 through a window 56. Therefore, the horizontal beam P1 can be used as vertical mark and the beam P2 can be used as horizontal mark.

If the carrier is rotated 90 degree, the horizontal beam P1 can be used as horizontal mark.

Figure 51:
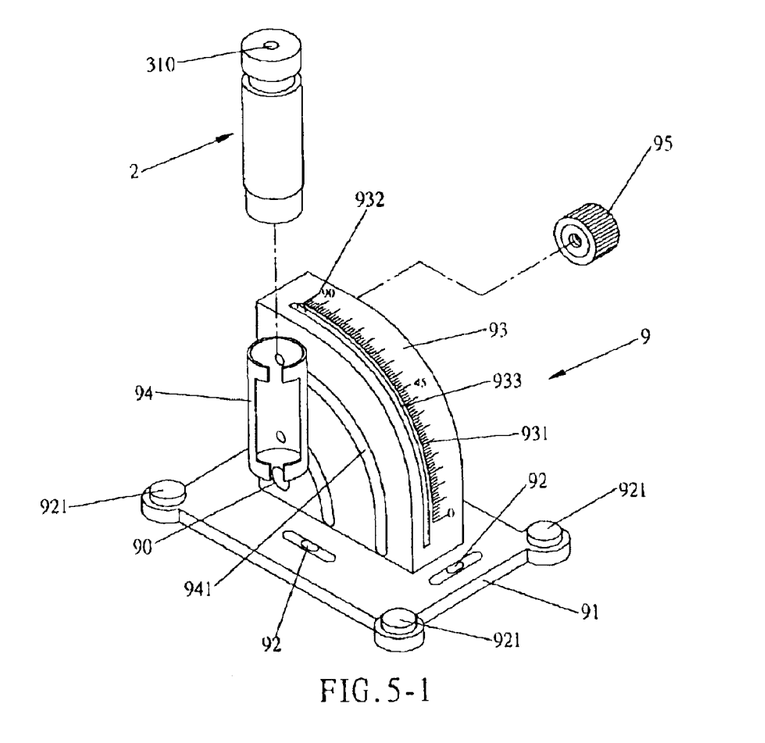
Figure 52:
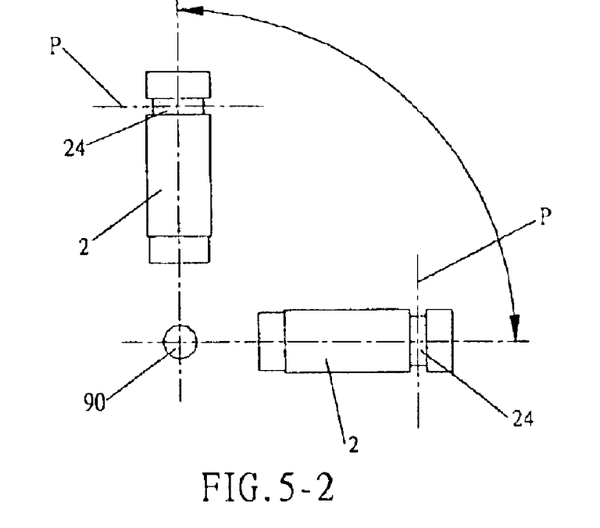

As shown in FIG. 5-1, the casing 2 can be supported by a carrier 9 with a changeable angle to obtain an omni directional laser mark. The carrier 9 comprises a bottom plate 91 with an arc-shaped supporter 93 and a level 92. The carrier 9 comprises an adjusting screw 921 at a corner thereof to set horizontal state of the carrier 9. The arc-shaped supporter 93 has a coupling member 94 on one end thereof, in which the casing 2 is received. More particularly, the vertical line of the casing 2 is aligned with 90 degree mark of the arc-shaped supporter 93. The arc-shaped supporter 93 has a sliding groove 933 in which an indicator 932 slides. The indicator 932 is corresponding to a mark 931. The coupling member 94 is slidably arranged in a sliding groove 94 of the arc-shaped supporter 93. The swinging angle of the sliding groove 94 is constrained by the coupling shaft 90 and locked by a locking knob 95. The sliding groove 94 is linked with the indicator 932 for changing angle of the casing 2. As shown in this figure, the casing 2 is received in the coupling member 94, and fixed to vertical position by the locking knob 95. As shown in FIG. 5-2, the light beam P emitted from the window 24. The coupling member 94 can be rotated by releasing the locking knob 95 to move the casing to 45 degree or horizontal position. The horizontal beam then becomes vertical mark.

The carrier 9 with 90 degree changeable angle can tune the horizontal beam to arbitrary angle and the carrier 9 can be reverse rotated to provide 180 degree marking.

Figure 53:
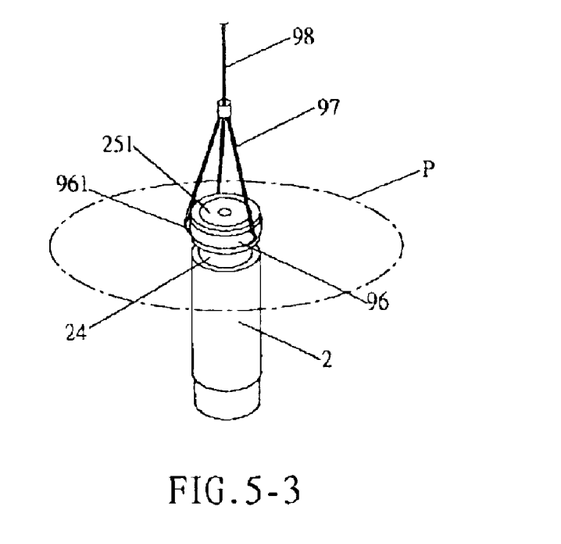

As shown in FIG. 5-3, the casing 2 can be supported by a plumb line 98 for providing horizontal beam P. The casing 2 is hung to the plumb line 98 through a plurality of supporting wires 97. Each of the plurality of supporting wires 97 is bound to a lug 961 of a hoop 96. The supporting wire 97 can be hung to an inner hole of the lug 961 to adjusting the length thereof.

Figure 6:
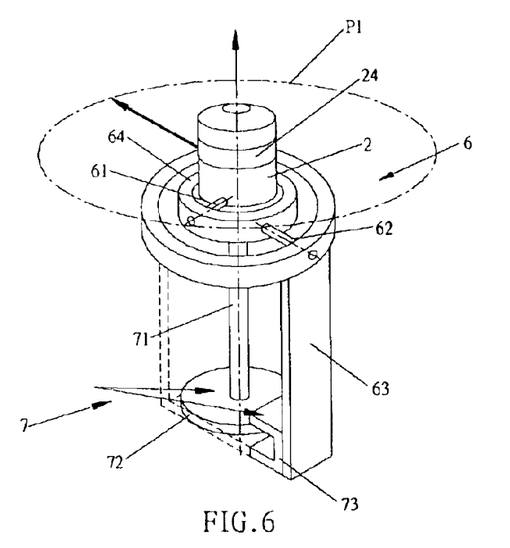
FIG. 6 shows a perspective view of the laser meter of the present invention.

With reference to FIG. 6, the casing 2 is assembled to a droop means 7 through a universal coupling stage 6, wherein the droop means 7 comprises a pendulum 72 and a swing link 71. The casing 2 is connected to an axial rack 64 though an X shaft 61 in radial direction and connected to a supporting stage 63 through a Y shaft 62 such that a floating universal coupling stage 6 is arranged atop the supporting stage 63. A magnetic device is formed below the supporting stage 63 and corresponding to the pendulum 72 to prevent over swing. The universal coupling stage 6 enables the casing 2 to be a free body and aligning with gravity. The light is emitted from the window to be a horizontal light P1 for horizontal mark.

Figure 7:
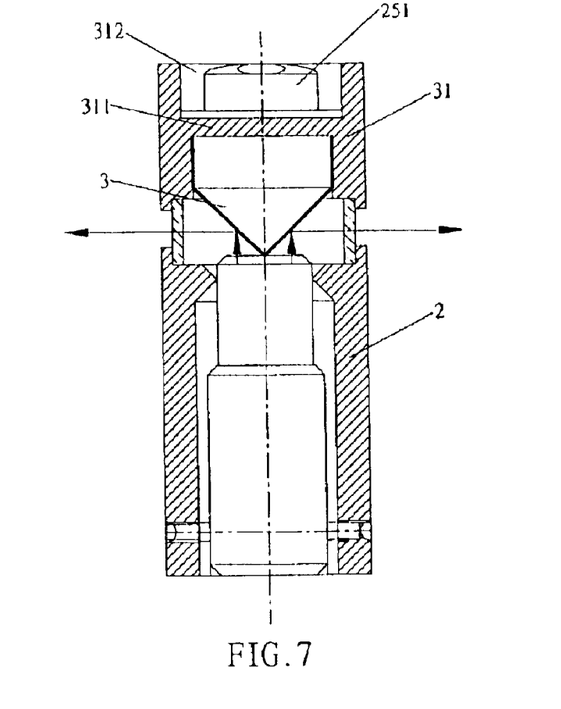
FIG. 7 shows a sectional view of the laser meter of the present invention.

With reference to FIG. 7, in the horizontal arrangement of the present invention, a groove 312 is defined by a baffle 311 atop the shell 31. A bubble level 251 is placed in the groove 312 for basic horizontal calibration.

Figure 8:
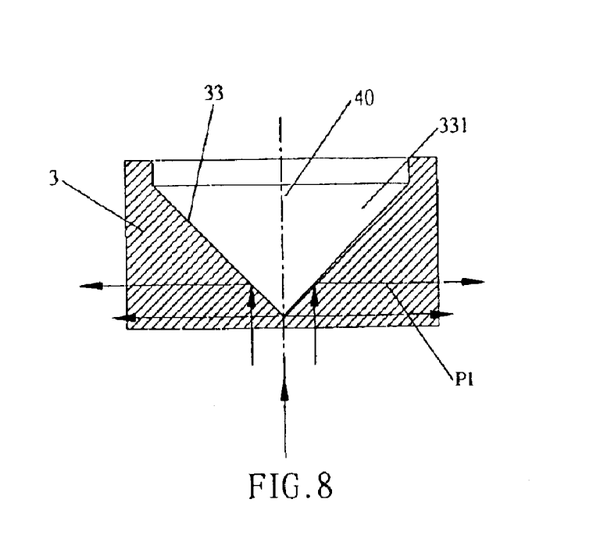
FIG. 8 shows a partial sectional view of the laser meter of the present invention.

With reference to FIG. 8, the reflection means 3 is a light guiding body with a conic groove 331 thereon and having reflecting face 33 formed by coating. The included angle between the conic groove 331 and the light axis is 45 degree.

Figure 9:
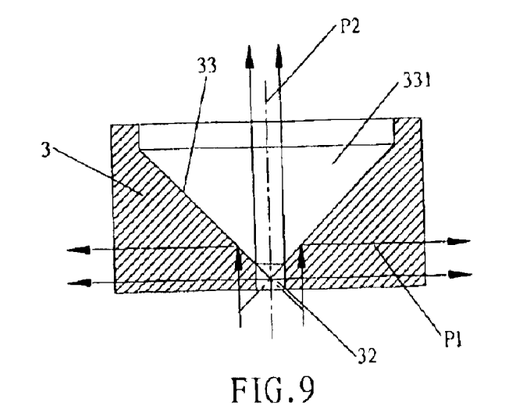
FIG. 9 shows a partial sectional view of the laser meter of the present invention.

With reference to FIG. 9, the reflection means 3 has a through hole 32 through which a beam P2 is formed and peripheral light is diffused to form a horizontal light P1. The light guiding body is used to prevent diffraction by air.

Figure 10:
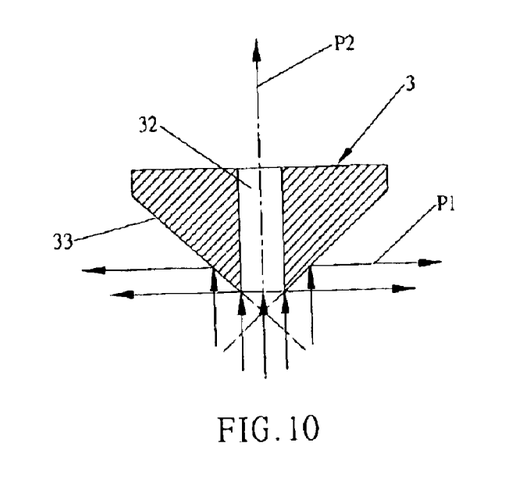
FIG. 10 shows a partial sectional view of the laser meter of the present invention.

With reference to FIG. 10, the reflection means 3 is a reflecting body with a reflecting face 33 of 45 degree such that the laser light is reflected to form a planar beam P1. The reflection means 3 has a through hole 32 through which a beam P2 passes.

Figure 11:
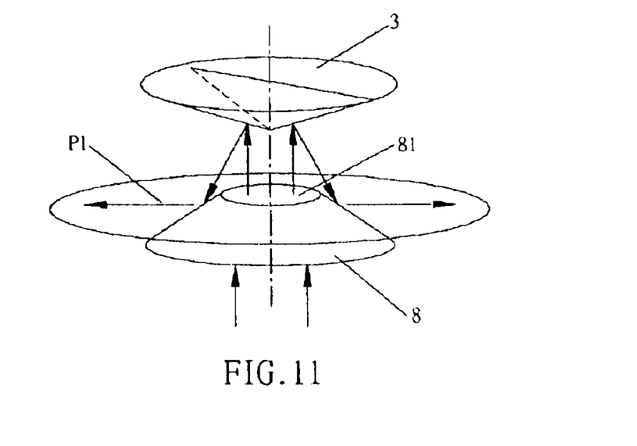
FIG. 11 shows the laser meter of the present invention with a reflecting disk.

With reference to FIG. 11, to further reduce the height of the window, a reflecting disk 8 is formed below the reflection means 3 and a bevel is formed therebetween such that the planar beam P1 is emitted in horizontal direction. The reflecting disk 8 has a through hole 81 through which laser beam passes and is reflected by the reflection means 3 to reinforce the planar beam P1.

Figure 12:
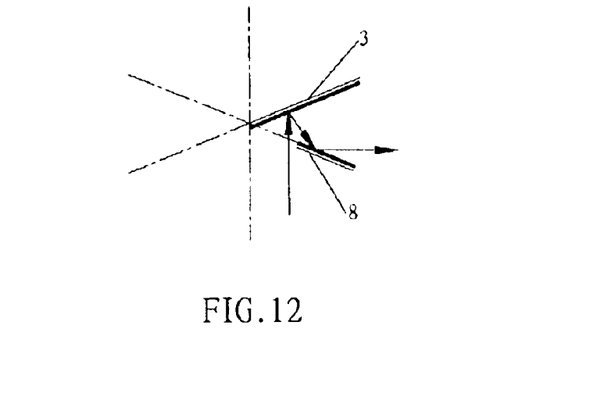
FIG. 12 shows a partial portion of the laser meter of the present invention in FIG. 11.

With reference to FIG. 12, the included angle between the reflection means 3 and the reflecting disk 8 is 45 degree such that a laser light is reflected by the reflection means 3 and the reflecting disk 8 to form the planar beam P1.

Figure 13:
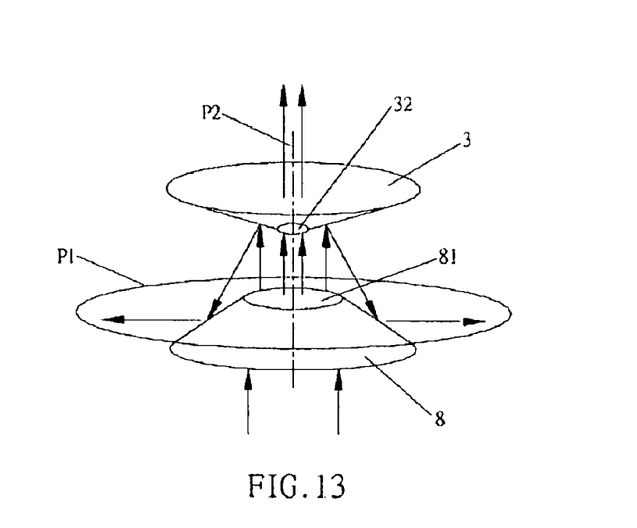
FIG. 13 shows the laser meter of the present invention with a reflecting disk.

With reference to FIG. 13, a through hole 32 is formed at top center of the reflection means 3 to provide a vertical beam P2 beside the planar beam P1.

Figure 14:
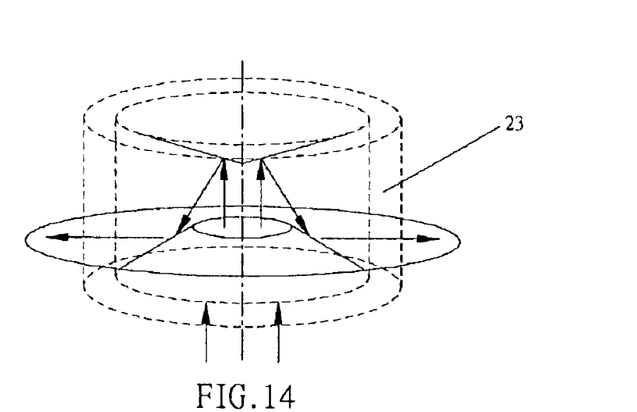
FIG. 14 shows the laser meter of the present invention with an enclosure.

With reference to FIG. 14, an enclosure 23 is formed outside the reflecting disk 8 to prevent the invade of dirt and damp.

Figure 15:
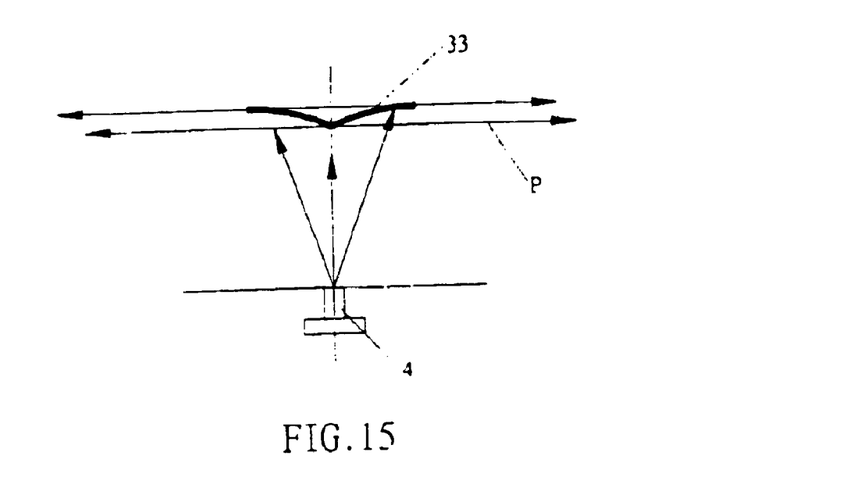
FIG. 15 shows reflection from the parabolic surface of the present invention.
Figure 16:
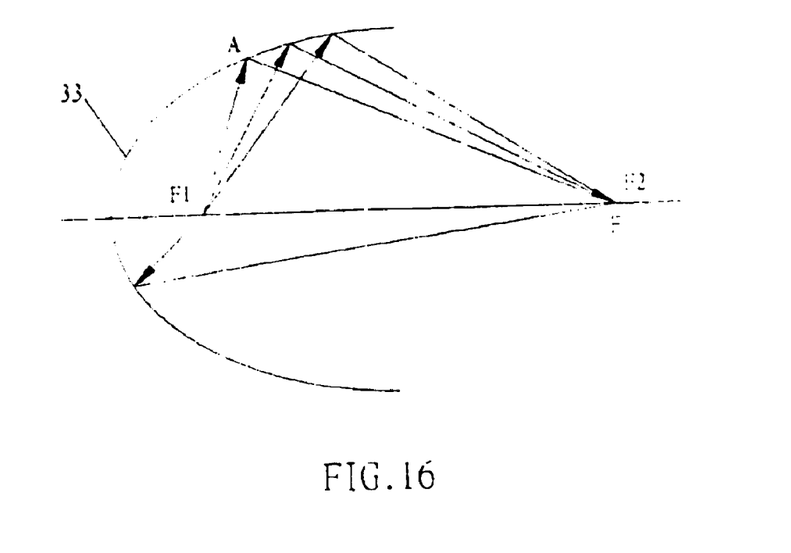
FIG. 16 shows reflection from the ellipsoidal surface of the present invention.

With reference to FIG. 15 and FIG. 16, the laser module 4 emits an laser light beam to the reflecting surface 33 thereby either forming horizontal light beam P in accordance with variable curved surface thereof, or forming focal point F in order to achieve greater and stronger light beam focusing effect. In addition, the inner curve arc-shaped reflection means 3 is able to perform relatively reduced height by applying the variable curved surface thereof.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A laser meter comprising:
   a casing;
   a laser module inside the casing for generating light;
   a reflection means coaxial with the laser module and having circular circumference for radially projecting the light in substantially planar manner therefrom.

2. The laser meter as in claim 1, wherein the casing has a base to provide vertical and horizontal beam.

3. The laser meter as in claim 1, wherein the casing includes a base having an adjusting screw coupled thereto.

4. The laser meter as in claim 1, wherein the reflection means has a through hole along the axis of the laser.

5. The laser meter as in claim 1, wherein the reflection means has a bubble level on top thereof.

6. The laser meter as in claim 1, wherein the casing has a bolt at longitudinal circumference thereof.

7. The laser meter as in claim 1, wherein the laser module is operable to direct an annular light beam onto the reflection means.

8. The laser meter as in claim 1, wherein the reflection means is made of light conducting material.

9. The laser meter as in claim 1, further comprising a reflecting disk to provide second reflection.

10. The laser meter as in claim 1, further comprising an enclosure formed outside the reflecting disk.

11. The laser meter as in claim 1, wherein the laser module has a screw for adjusting optical axis.

12. The laser meter as in claim 1, wherein the casing can be adjusted in omni direction.

13. The laser meter as in claim 1 or 12, wherein the casing includes a base having a level indicator and an adjusting screw.

14. The laser meter as in claim 1, wherein a supporting stage is provided to provide horizontal state for the casing.

15. The laser meter as in claim 1, wherein the casing is rotated for horizontal application.

16. The laser meter as in claim 1, wherein the reflection means is performed in an inner curve arc-shaped reflecting surface.

* * * * *